Jan. 31, 1967    J. WIGINGTON    3,302,088
CONTROLLED RECTIFIER SPEED-REGULATING
SYSTEMS FOR SERIES COMMUTATOR MOTORS
Filed March 19, 1964    2 Sheets-Sheet 1

INVENTOR.
Jerry Wigington
BY
Marshall J. Breen
ATTORNEY

WITNESS
Joseph V. Drillo

United States Patent Office 3,302,088
Patented Jan. 31, 1967

3,302,088
CONTROLLED RECTIFIER SPEED-REGULATING SYSTEMS FOR SERIES COMMUTATOR MOTORS
Jerry Wigington, Pickens, S.C., assignor to The Singer Company, New York, N.Y., a corporation of New Jersey
Filed Mar. 19, 1964, Ser. No. 353,102
5 Claims. (Cl. 318—246)

This invention relates to motor control circuits and more particularly to circuits using solid state devices for controlling and regulating the speed of series commutator motors fed from a supply of alternating current.

A prior art circuit of the type using a solid-state controlled rectifier for controlling and regulating the speed of a series commutator motor is shown and described in the U.S. Reissue Patent No. 25,203 (assigned to the same assignee as the present invention). In this patented circuit the field winding is so located in the circuit that it receives current only when the rectifier is in its conducting state. During the negative half cycles of the line voltage, when the rectifier is blocking, the field current goes to zero. The field flux, however, does not go to zero but decreases to a small constant residual value dependent on the hysteresis of the field core material. The armature rotating in this small flux field generates a back E.M.F. proporationed to the constant residual flux and the rotational speed. It is this speed-responsive back E.M.F. which is compared with a manually-adjustable reference voltage to control the firing of the rectifier during the positive swings of the line voltage. In effect the rectifier controls the current fed to the motor such that the back E.M.F. is made substantially equal to the reference voltage and thus automatic speed regulation is provided.

For some series motors, significantly those of higher power ratings and fewer armature winding turns, it has been found that the armature back E.M.F. at low speeds due to the residual field flux *alone* is not sufficient to provide a usable feedback signal, and instability in the speed regulation results. To correct the above-noted deficiencies, it is proposed, according to the present invention, to increase the level of the feedback signal for a given armature rotational speed by simple circuit means which provide controlled excitation of the field winding independently of the armature current.

It is an object of this invention therefore to provide speed regulating control circuits for series commutator motors which motors do not supply sufficient armature back E.M.F. from residual field flux alone to provide a stable speed regulating function.

It is a further object of this invention to provide simple circuit means for deriving from the armatures of series motors feedback signals of larger magnitude than those obtainable from residual field flux alone.

With the above and other objects in view as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings, FIG. 1 is a schmatic diagram of a circuit embodying one form of the invention.

Figure 1:
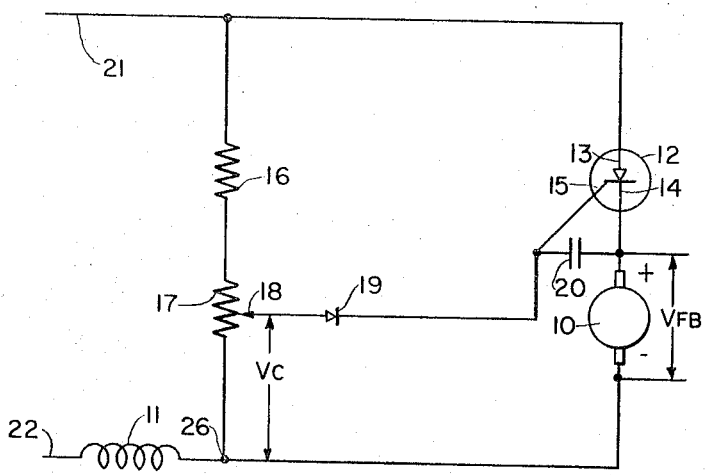

Referring to FIG. 1, there is shown diagrammatically an electric motor of the series commutator type having an armature winding 10, and a field winding 11; a silicon controlled rectifier 12 having an anode 13, a cathode 14 and a gate 15; a fixed resistor 16, a potentiometer 17 having a slider 18; a diode 19 and a capacitor 20. Leads 21 and 22 are adapted to be connected to a regular source of A.C. voltage.

It will be seen that the circuit configuration of FIG. 1 provides two parallel paths for current flow through the fild winding 11 from the A.C. voltage source. A first path is from lead 21 through resistor 16, potentiometer resistance 17 and field winding 11 to lead 22. A second path is from lead 21 through the anode 13 and cathode 14 of rectifier 12, armature winding 10 and field winding 11 to lead 22. The first path above provides alternating current excitation of the field 11 of a fixed predetermined amount. The second path above provides unidirectional excitation of the field dependent on the firing of the reitfier 12. During the non-firing periods of the rectifier 12, which periods occur during each half cycle when the anode 13 is negative with respect to the cathode, the field flux due ot the second-path current drops to a small but positive residual value. In some motors having few armature winding turns, the back E.M.F. generated by the armature due to the residual flux at low speeds is not large enough to effect a definite control of the gate current and, where this is the only source of field flux, the speed regulation control is lost and the speed becomes erratic. This adverse condition may be avoided according to the present invention by providing an additional path for current flow through the field winding which is independent of the path through the controlled rectifier. This is the first path above described with respect to the circuit of FIG. 1 and we will now describe its operation.

*Operation (FIG. 1)*

The circuit comprising resistor 16, potentiometer 17, and field winding 11 functions as a voltage divider to provide an adjustable A.C. reference voltage Vc between slider 18 and point 26 at the bottom end of the potentiometer resistor 17. The armature 10 generates a speed voltage VFB which during the non-conducting period of rectifier 12 is the only voltage in series with the reference voltage Vc with respect to the gate 15 and cathode 14. The speed or feedback voltage VFB is positive toward the cathode 14 and negative toward the gate 15 as shown. The diode 19 is of such polarity as to permit only positive current to flow to the gate. Thus the rectifier will fire during the half cycles of positive anode voltage when $Vc - VFB = VGT$, where VGT is the voltage which causes positive gate firing current (IGF) to flow.

Figure 4:
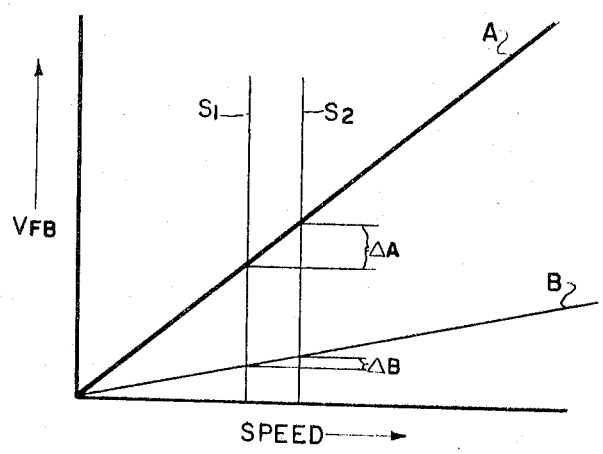
FIG. 4 shows curves illustrating the beneficial effect of the invention in increasing the senstivity of VFB with speed change.

It will be seen that VFB is the speed measuring signal which determines if and when the rectifier 12 is triggered into conduction in each positive half cycle of line voltage. For good speed regulation, VFB should be sufficiently sensitive to speed change. A motor having an inherently sensitive VFB would show a plot of VFB versus speed as curve A of FIG. 4 and a motor of low VFB sensitivity would appear as having characteristics similar to curve B. It will be seen that for a speed change from $S_1$ to $S_2$ the change ΔA in VFB for the curve A is several times the change ΔB in VFB for curve B. Since VFB will contain "noise" components due to commutator voltage transients, the signal change of curve B may not be sufficient to discriminate against these "noise" components and thus control will become erratic. It thus becomes important to provide for motors having inherently low residual VFB (curve B) some circuit means for effectively increasing the VFB versus speed response toward the characteristic of curve A in FIG. 4. This is accomplished in the circuit of FIG. 1 by placing the field winding 11 in circuit so that the current taken by the voltage divider resistors 16 and 17 also flows through the field winding. The inductive reactance of the field winding 11 at the line frequency is so low relative to the resistance of 16 and 17 that the current in the field winding although slightly lagging is substantially in phase with the line voltage applied to leads 21, 22. Thus during the major portion of positive half cycles of line voltage, the field flux will be increased above its normal residual value by the sinusoidal current supplied to the field winding through the voltage divider 16, 17. The capacitor 20 in shunt with the gate 15 and cathode 14 provides a low impedance path for the commutator transient voltages to prevent random firing from such transients.

Figure 5:
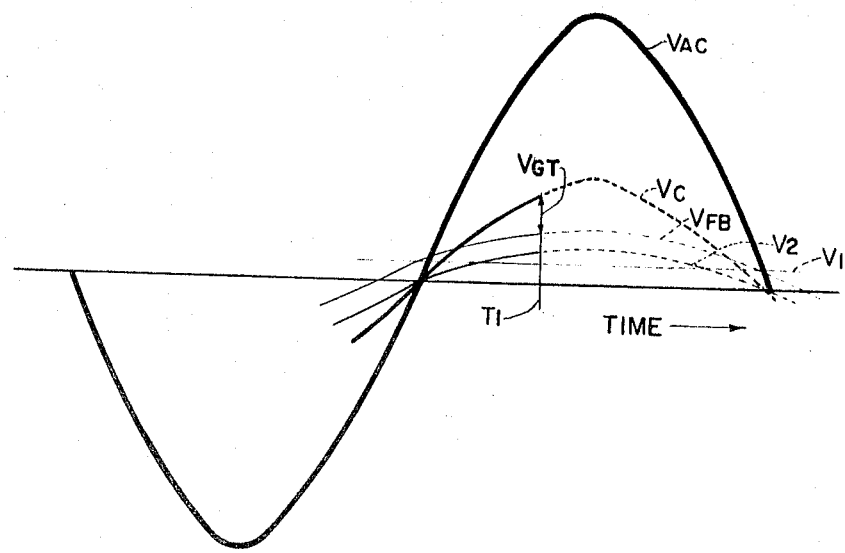
FIG. 5 is a voltage diagram illustrating the operation of the circuit of FIG. 1.

FIG. 5 illustrates the above effect with respect to the circuit of FIG. 1, where VAC is the line voltage applied to leads 21, 22, Vc is the reference voltage and VFB is the back E.M.F. of the armature as indicated in FIG. 1. It will be seen that VFB has been increased from the D.C. value $V_1$, which is supplied by the residual flux alone, by the addition thereto of $V_2$ which is supplied by the current in the path through the voltage divider 16, 17. At the point in time denoted by $T_1$, $Vc-VFB$ equals the gate firing voltage VGT and the rectifier 12 is triggered into conduction. Before $T_1$, during the non-conducting period, the voltages are as shown in the full lines. After $T_1$ these voltages, which would be discontinuous at this point, are shown dashed, which is the form they would have if the rectifier 12 did not conduct at $T_1$. This is done merely to avoid confusion by preserving the continuous identity of the voltages. Actually the form of these voltages after $T_1$ is immaterial because the gate has lost control.

It will be obvious that the field winding 11 could alternatively be placed in series with lead 21 to secure the same performance, the important criterion being that the field winding receives a fixed current independently of the path through the controlled rectifier 12, so that the field flux is increased above its residual level by a predetermined value during the positive half cycles of line voltage when the controlled rectifier is non-conducting.

Figure 2:
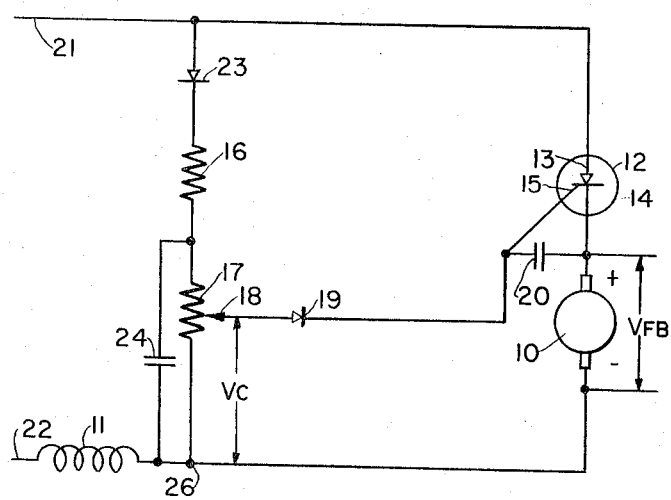
FIG. 2 is a schematic diagram of a circuit showing a modified form of the invention.

The circuit of FIG. 2 is essentially the same as that of FIG. 1 except that a diode 23 is used in series with the voltage divider 16, 17 and is so polarized as to conduct on positive swings of line voltage. This has several advantages. First, it supplies current to the voltage divider 16, 17 only during the positive swings of the line voltage when it is needed to establish a reference voltage Vc, and the elements 16 and 17 can accordingly be derated and made smaller physically because of the smaller current duty. Second, it enables the optional use of a polarized capacitor 24 across potentiometer resistance 17 to improve and sustain the D.C. level of Vc, and third, it prevents reverse current from flowing through the field winding thus avoiding any tendency to destroy the residual flux.

Figure 3:
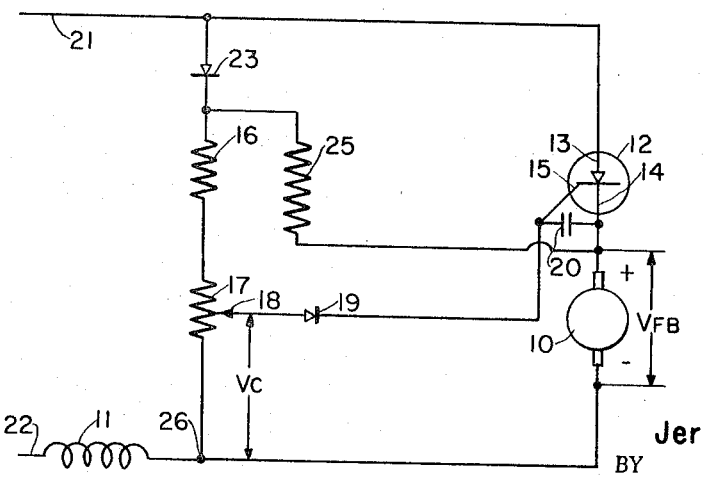
FIG. 3 is a schematic diagram showing a further modified form of the invention.

The circuit of FIG. 3 is useful where insufficient current is supplied by the voltage divider path to raise the VFB to the required level. In this case a second path of fixed impedance for current flow through the field winding 11 during positive swings of the line voltage is formed by the diode 23, a resistor 25, the armature winding 10 and the field winding 11. The resistance of the armature winding 10 will ordinarily be very small compared with the resistance of the voltage divider 16, 17, so that the resistor 25 may be chosen to supply current to the field 11 quite independently of the voltage divider path. Further, the current duty of the resistor 25 is quite low because, as soon as the rectifier 12 conducts, its low forward voltage drop effectively shorts out the resistor 25. This enables the use of a physically small unit for resistor 25.

It will be seen from inspection of the circuit of FIG. 3 that the benefits of increasing the VFB level could also be obtained if the field winding 22 were to be positioned in this circuit between the lower end of the armature winding 10 and point 21. Although this alternative position for the field represents a less desirable one than that shown because it would adversely increase the time constant $(L/R)$ of the gate circuit and thus delay the rise of gate firing current, it is nevertheless an operative position and might be a desirable one where it is impractical to make a circuit connection internally to the junction of armature and field windings as normally required at point 26.

It will be evident from the foregoing that there is provided, according to this invention, circuit means which effect predetermined controlled current flow through the series field winding independently of the armature current and in a direction to increase the level of the armature back E.M.F. from that available due to residual flux alone so that a stable speed-regulating function is obtained.

Having thus described the nature of the invention, what I claim herein is:

1. A motor control circuit comprising an electric motor adapted to be supplied from an alternating current source and having series-connected armature and field windings, a solid-state controlled rectifier having an anode-cathode circuit and a gate-cathode circuit, a signal channel including said motor armature for transmitting to said gate-cathode circuit the back E.M.F. of said motor as negative bias therefor, first circuit means including the anode-cathode circuit, the armature winding and the field winding connected in series, second circuit means including an impedance and the field winding connected in series, said first and second circuits being adapted to be connected in shunt relation across said alternating current source, and an adjustable portion of said impedance being included in series with said signal channel.

2. A motor control circuit comprising an electric motor having series-connected armature and field windings and adapted to be supplied from an alternating current source, a solid-state controlled rectifier having an anode-cathode circuit and a gate-cathode circuit, a signal channel including said armature winding for transmitting to said gate-cathode circuit the back E.M.F. of said motor as negative bias therefor, first circuit means including the anode-cathode circuit, the armature winding, and the field winding connected in series, and second circuit means including a fixed rectifier, an impedance and the field winding connected in series, said first and second circuits being adapted to be connected in shunt relation across said alternating current source, said fixed rectifier and said controlled rectifier being so poled as to pass current through the field in the same direction.

3. A motor control circuit comprising an electric motor having series-connected armature and field windings and adapted to be supplied from an alternating current source, a solid-state controlled rectifier having an anode-cathode circuit and a gate-cathode circuit, a signal channel including said armature winding for transmitting to said gate-cathode circuit the back E.M.F. of said motor as negative bias therefor, first circuit means including the anode-cathode circuit, the armature winding, and the field winding connected in series, second circuit means including a fixed rectifier, an impedance and the field winding connected in series, said first and second circuits being adapted to be connected in shunt relation across said alternating current source, said fixed rectifier and said controlled rectifier being so poled as to pass current through the field in the same direction, and an adjustable portion of said impedance being included in series in said signal channel.

4. A circuit for controlling the speed of an electric motor having series-connected armature and field windings adapted to be supplied from an alternating current source comprising: a solid-state controlled rectifier having an anode-cathode circuit and a gate-cathode circuit, first circuit means including the anode-cathode circuit, the armature winding and the field winding connected in series, second circuit means including a fixed rectifier, a first fixed impedance and the field winding connected in series, said first and second circuit means being adapted to be connected in shunt relation across said alternating current source, a signal channel including said armature winding and an adjustable portion of said first fixed impedance in series with said gate-cathode circuit, and a second fixed impedance connected in series with said fixed rectifier to form therewith a shunt path around said anode-cathode circuit of said controlled rectifier.

5. A circuit for controlling the speed of an electric motor having series-connected armature and field windings adapted to be supplied from an alternating current source comprising: a solid-state controlled rectifier having an anode-cathode circuit and a gate-cathode circuit, first circuit means including the anode-cathode circuit, the armature winding and the field winding connected in series, second circuit means including a fixed rectifier, a fixed impedance, the armature winding and the field winding connected in series, said first and second circuit means being adapted to be connected in shunt relation across said alternating current source, and a signal channel including said armature winding and a variable signal source in series with said gate-cathode circuit.

References Cited by the Examiner
UNITED STATES PATENTS

| | | | |
|---|---|---|---|
| Re. 25,203 | 7/1962 | Momberg et al. | 318—246 |
| 3,165,688 | 1/1965 | Gutzwiller | 318—331 X |
| 3,191,112 | 6/1965 | Cain | 318—331 X |
| 3,222,583 | 12/1965 | Gutzwiller | 318—331 X |

OTHER REFERENCES

Gutzwiller: "Universal Motor Speed Controls," G.E. App. Note 200.4, June 1961, pp. 3–7.

ORIS L. RADER, *Primary Examiner.*

J. C. BERENZWEIG, *Assistant Examiner.*